US009237075B2

(12) United States Patent
Filsfils et al.

(10) Patent No.: US 9,237,075 B2
(45) Date of Patent: Jan. 12, 2016

(54) ROUTE CONVERGENCE MONITORING AND DIAGNOSTICS

(71) Applicant: CISCO TECHNOLOGY, INC., San Jose, CA (US)

(72) Inventors: Clarence Filsfils, Brussels (BE); Ketan Jivan Talaulikar, Pune (IN); Balaji Muthuvarathan, Puducherry (IN)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 13/758,501

(22) Filed: Feb. 4, 2013

(65) Prior Publication Data

US 2013/0265881 A1    Oct. 10, 2013

Related U.S. Application Data

(60) Provisional application No. 61/621,811, filed on Apr. 9, 2012.

(51) Int. Cl.
*H04L 1/00* (2006.01)
*H04L 12/26* (2006.01)
*H04L 12/721* (2013.01)
*H04L 12/24* (2006.01)

(52) U.S. Cl.
CPC ............... *H04L 43/00* (2013.01); *H04L 41/00* (2013.01); *H04L 43/04* (2013.01); *H04L 43/08* (2013.01); *H04L 43/0805* (2013.01); *H04L 45/70* (2013.01); *H04L 41/0681* (2013.01)

(58) Field of Classification Search
CPC ........... H04J 3/14; H04L 43/50; H04L 43/00; H04L 12/66; H04L 2012/46; H04L 12/56
USPC ......... 370/241, 242, 247, 248, 251, 254, 292, 370/401, 409, 465, 216, 228, 389, 412; 709/242, 238, 223, 225
See application file for complete search history.

(56) References Cited

U.S. PATENT DOCUMENTS

| 6,857,026 | B1 * | 2/2005 | Cain .............................. 709/239 |
| 7,002,960 | B1 | 2/2006 | Golan et al. |
| 7,027,396 | B1 | 4/2006 | Golan et al. |
| 7,532,631 | B2 * | 5/2009 | Raszuk et al. ................. 370/401 |
| 7,627,290 | B2 * | 12/2009 | Wing et al. ................ 455/67.13 |
| 7,743,139 | B1 | 6/2010 | Golan et al. |
| 7,898,973 | B2 | 3/2011 | Filsfils et al. |
| 2008/0298265 | A1 | 12/2008 | Filsfils et al. |

FOREIGN PATENT DOCUMENTS

WO    WO/2006/130830    12/2006

OTHER PUBLICATIONS

IETF RFC 6413, Poretsky Allot, et al., "Benchmarking Methodolofy for Link-State IGP Data-Plane Route Covnergence", Nov. 22, 2011.
H. Gredler et al., "Advertising Link-State Information in BGP", Jul. 11, 2011.
IETF Internet Draft "Advertising Link-State Information in BGP" draft-gredler-bgp-te-01, H. Gredler, Jul. 11, 2011.
IETF RFC 3107, "Carrying Label Information in BGP-4", Y. Rekhter et al., May 2001.

* cited by examiner

*Primary Examiner* — Chi H Pham
*Assistant Examiner* — Alexander O Boakye
(74) *Attorney, Agent, or Firm* — Cindy Kaplan (57) ABSTRACT

In one embodiment, a method includes assigning an identifier to a route computation at a network device, grouping route updates for the route computation, marking at least one route update for each group of route updates with the identifier, tracking flow of marked route updates at a plurality of routing components within the network device, and storing tracking data at the network device for use in convergence monitoring. An apparatus and logic are also disclosed herein.

20 Claims, 5 Drawing Sheets

ROUTE CONVERGENCE MONITORING AND DIAGNOSTICS

STATEMENT OF RELATED APPLICATION

The present application claims priority from U.S. Provisional Application No. 61/621,811, entitled NETWORK AVAILABILITY ANALYTICS, filed on Apr. 9, 2012. The contents of this provisional application are incorporated herein by reference in its entirety.

TECHNICAL FIELD

The present disclosure relates generally to communication networks, and more particularly, to route convergence monitoring.

BACKGROUND

In conventional networks, measurement of network convergence involves injecting probes throughout the network. Such techniques do not scale well and hence suffer from accuracy issues (not enough probes are sent to measure at a millisecond timescale) and completeness issues (probes cannot be sent on all the possible paths through the network). Also, probes may simply report of a problem without the ability to pin point its location and provide details for use in analyzing the root cause.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises assigning an identifier to a route computation at a network device, grouping route updates for the route computation, marking at least one route update for each group of route updates with the identifier, tracking flow of marked route updates at a plurality of routing components within the network device, and storing tracking data at the network device for use in convergence monitoring.

In another embodiment, an apparatus generally comprises a plurality of routing components and a processor for assigning an identifier to a route computation at the apparatus, grouping route updates for the route computation, marking at least one route update for each group of route updates with the identifier, and tracking flow of marked route updates at the routing components. The apparatus further comprises memory for storing tracking data for use in convergence monitoring.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Faster convergence requirements have resulted in a need for monitoring and assessment of convergence performance. Difficulties in monitoring network convergence arise due to large network size, smallness of measured parameters, non-predictability of convergence events, and level of details needed to correctly assess convergence performance. Conventional systems often inject probes through the network to measure key metrics. However, this technique does not scale well and suffers from accuracy issues. For example, not enough probes may be provided to measure at a millisecond timescale. Also, there are completeness issues since probes cannot be sent on all of the possible paths through the network. Furthermore, probes may simply report a problem without the ability to identify its location or provide details needed to analyze the cause of the problem.

The embodiments described herein measure network convergence in an end-to-end manner, for any flow, at an accuracy of a few milliseconds. As described in detail below, RCMD (Route Convergence Monitoring and Diagnostics) is implemented at routers in the network to measure the convergence behavior of various routing protocols and extensions (e.g., ISIS (Intermediate System-to-Intermediate System), OSPF (Open Shortest Path First), BGP (Border Gateway Protocol), TE (Traffic Engineering), LDP (Label Distribution Protocol), LFA (Loop Free Alternate), PIM (Protocol Independent Multicast), mLDP (multicast Label Distribution Protocol)).

RCMD provides features such as scalability (monitors prefixes across all events), completeness (all routers tracked across all linecards), correlation (tracking data linked to routing computation trigger), accuracy (within a few milliseconds), always-on (failure can occur at any time), everywhere (failure can occur anywhere and rerouting may take place anywhere), lightweight (no degradation of router performance), and persistence (data archived to allow for infrequent access to data).

The embodiments provide many operational statistics that were not previously available. Data provided by RCMD may be used, for example, to identify if end-to-end connectivity was restored within a specified period of time following a failure. The data may also be used to identify how network design changes affect convergence or how different routers or network segments handle failures.

Figure 1:
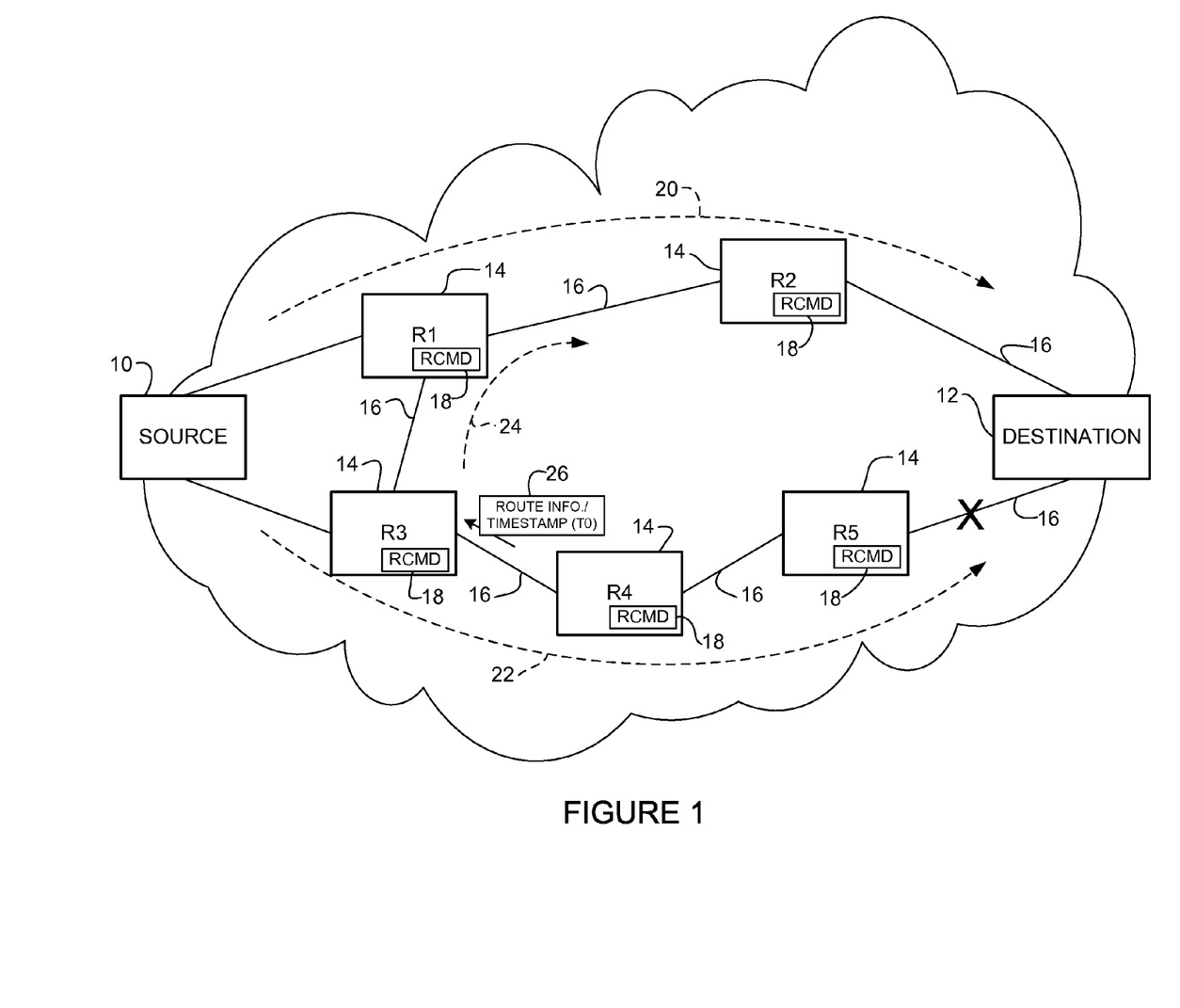
FIG. 1 illustrates an example of a network in which embodiments described herein may be implemented.

Referring now to the drawings, and first to FIG. 1, an example of a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, or other network devices), which facilitate passage of data within the network.

The network shown in the example of FIG. 1 includes a source 10, destination 12, and a plurality of routers 14 (R1, R2, R3, R4, R5) connected by links 16. The routers 14 may be any network device (e.g., router, switch/router) configured to perform routing functions. The routers 14 may be located, for example, in a service provider core network, or any other network. The source and destination 10, 12 may be, for example, edge routers, or any other network device. A Route Convergence Monitoring and Diagnostics (RCMD) module 18 is located at one or more of the routers 14. In the example shown in FIG. 1, each router 14 is configured for RCMD, however, there may be one or more routers that are not configured for RCMD. Also, the source 10 and destination 12 may also be configured for RCMD.

RCMD is used to collect and report data related to routing convergences. RCMD provides an 'in-router' view of convergence events. Data can be exported (e.g., via XML (Extensible Markup Language)) and correlated and leveraged by an offline tool. RCMD can operate in a monitoring mode for detecting events and measuring convergence, and a diagnostics mode for additional debug information collection for abnormal events. As described in detail below, RCMD identifies all of the reasons (i.e., triggers) that lead to a given routing table recomputation (route computation). This identification scheme allows for correlation across all route convergence measurements.

In the example shown in FIG. 1, prior to a network failure, packets follow a first path 20 and a second path 22. At time T0, a link failure occurs between R5 and the destination 12. One or more of the routers 14 in the network identifies the link failure and notifies the router R3 of the failure at time T1. Packets following route 22 are rerouted at R3 from R4 to R1, as shown by dashed line 24. At time T2 the network converges and traffic on path 24 reaches the destination 12. End-to-end network convergence refers to the time it takes for all routers in the network to adapt to a change in topology. The embodiments described herein may be used to measure the time it takes from a change in the network to the time for a router to adjust its hardware to the change (T2-T0). The embodiments may also be used to measure the time it takes for any router receiving the change information to make a change in its hardware such that the information is now used to forward packets (T2-T1). The time period (T2-T1) is significant in that many components are involved in operations at the router that lead to the change in hardware.

When a link goes down as shown in FIG. 1 and discussed above, the failure is detected at one of the routers and the detected failure is flooded throughout the network. A flooding measurement identifies the time between when the failure message originated at the detecting router R5 and when it is received at the rerouting router R3 (T1-T0). In one embodiment, a timestamp is used for marking time T0 at router R5 to indicate when a change occurs (e.g., link down). The routers transmit route information (e.g., a link state packet (LSP) in ISIS or a link state announcement (LSA) in OSPF) as indicated at packet 26 in FIG. 1. Router R5 adds a timestamp indicating the time (T0) that it originated the new route information. The rerouting router R3 receives the information at T1 and updates its routing information.

An update measurement identifies the time between when the failure notification is received at the rerouting router (T1) and when a last important prefix is installed across all of its linecards (T2). In one embodiment, convergence time (T2-T1) at the router 14 is measured using markers. The markers are flags attached to internal routing information associated with topology information received from the network. As described in detail below, the markers are tracked as the internal routing information propagates from one routing component to the next within software at the router. When any component receives a marker it saves a timestamp associated with that particular marker. The final component that modifies the hardware saves the timestamp, which is time T2. In order to provide scalability, only select routes are tracked. As described below, routes may be selected based on a policy such as priority. The routing components thus act on a limited number of markers rather than each route that is processed. This greatly reduces the work required to track the routes through the routing components and the amount of tracking data that needs to be stored.

A measurement component in the system collects tracking information on the router and by comparing the saved timestamps (T0 and T2) it can find the end-to-end convergence time. Problems local to the router may be identified by examining the time interval from T1 through T2. Based on operator configured thresholds, the router can raise alerts immediately upon an end-to-end convergence exceeding a threshold, or an update time at the router exceeding a threshold.

Each RCMD module 18 may be polled periodically (e.g., daily, weekly) for flooding and update measurements. The data may be collected at one of the routers 10, 12, 14, a network management station, or other network device. For each LSP or LSA that was flooded, an origination time is determined and for each remote router a flooding time is determined. The flooding time is equal to the time it took the remote router to receive the LSP or LSA. Thresholds may be set for the flooding time. For example, if the flooding time is greater than or equal to 100 msec, an orange flag is set, and if the flooding time is greater than or equal to 200 msec, a red flag is set. Averages and percentiles may be calculated for the flooding measurements.

With regard to the update measurements, for each router, for each convergence event, the time until the last important prefix was updated across all linecards is determined (update time'). The number (A) of important prefixes that were updated across all linecards is also determined. Thresholds may be set for update time and 'A'. For example, if A is greater than 1000 then scale is larger than expected. If A is less than or equal to 1000 and update time is greater than or equal to 250 msec, an orange flag is set. If A is less than or equal to 1000 and the update time is greater than or equal to 400 msec, a red flag is set. Averages and percentiles may also be calculated for the update measurements.

IGP (Interior Gateway Protocol) convergence on a router involves thousands of routes across tens of linecards. An important aspect of RCMD is recognition of the fact that it would not scale to log the update reasons and update times for all routes individually across all of the linecards. Instead, RCMD focuses on identifying all of the reasons (i.e., triggers) that lead to a given routing table recomputation. A unique identifier (marker) is allocated to each such computation and all of its related triggers are logged according to that identifier (ID). Each ID identifies a given topology (set of LSP/LSA changes). The resulting route updates from that computation are then grouped. In one embodiment, the route updates are grouped into four sets according to four IGP priorities (critical, high, medium and low). The first and last updates of each priority are then marked with the ID of the related computation. In this case, a single route computation (route event, route flow) is characterized by at most eight markers. Even if one routing event impacts 10,000 routes, only eight markers need to be monitored. Along the software path from the routing protocol to the update on the linecard hardware memory, each software component is instrumented to recognize the presence of a marker, and if so, to log the marker's ID and the time at which it was seen, as described in detail below.

As noted above, the identification scheme provides for scalability, completeness, correlation, persistency and accuracy. With regard to scalability, for each routing computation, even if thousands of routes need to be changed, only eight timestamps are taken per linecard (start and last for four priorities). All the routes are tracked across all of the linecards, which provides completeness. Each timestamp is related to a computation ID, which is linked to a set of routing causes (triggers) to provide correlation. A central RCMD process collects and correlates the raw data and prepares an event report after computing the convergence timeline. With regard to persistence, as only the key statistics are collected for each event, the router is able to retrieve and archive data before it is lost (e.g., due to log buffer overwrite). The archival is available on the router storage or external server and may be in XML format, for example. Time synchronization within a router is within a few milliseconds, thus the embodiments provide accurate convergence measurements.

Figure 2:
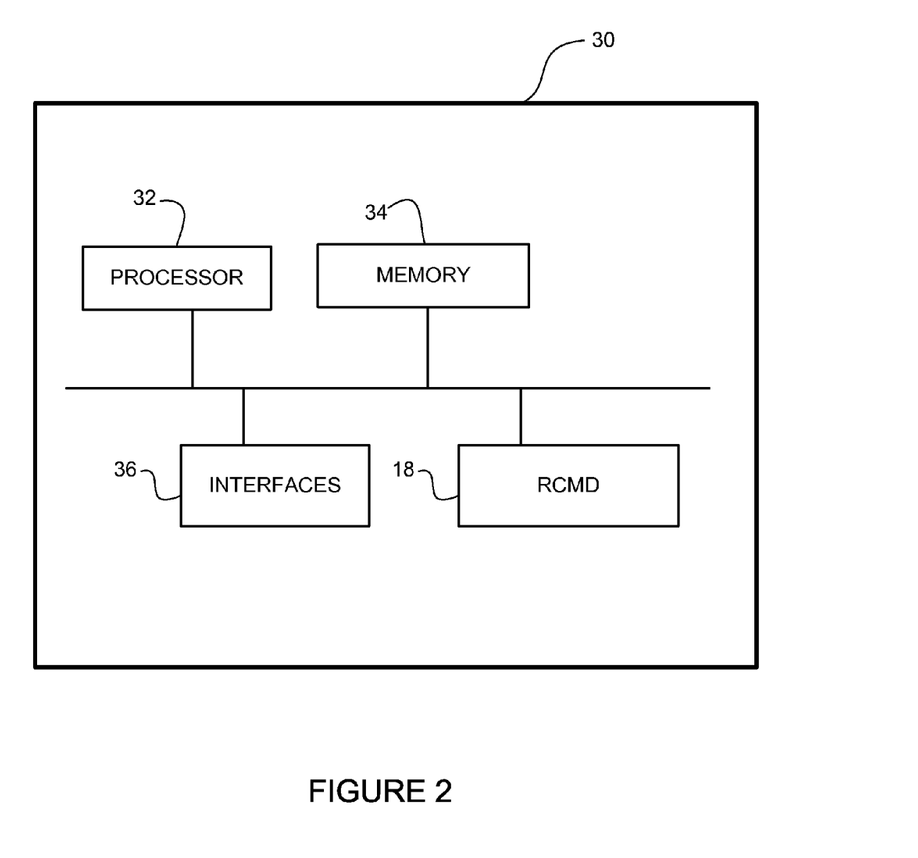
FIG. 2 depicts an example of a network device useful in implementing embodiments described herein.

FIG. 2 illustrates an example of a network device 30 (e.g., router) that may be used to implement the embodiments described herein. In one embodiment, the network device 30 is a programmable machine that may be implemented in hardware, software, or any combination thereof. The network device 30 includes one or more processor 32, memory 34, network interfaces 36, and RCMD module 18.

Memory 34 may be a volatile memory or non-volatile storage, which stores various applications, operating systems, modules, and data for execution and use by the processor 32. For example, memory 34 may include one or more routing and RCMD components implemented in software. In one embodiment, a non-blocking shared memory access infrastructure is used to track updates within the router so as not to impact performance.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The network interfaces 36 may include, for example, an Ethernet interface for connection to a computer or network.

The RCMD module 18 may include, for example, software or code stored in memory 34. Components of the RCMD module 18 are described below with respect to the functional block diagram shown in FIG. 4.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

As described in detail below, RCMD may be used for ISIS and OSPF convergence measurement and to gather details about SPF (Shortest Path First) runs and time taken to provision routes and LDP (Label Distribution Protocol) labels across all linecards on the router. RCMD may also be used to provide information about LFA (Loop Free Alternate) coverage available at the end of each SPF run, or track BGP (Border Gateway Protocol), TE (Traffic Engineering), or PIM (Protocol Independent Multicast) events. Since RCMD is used to monitor various routing convergence events, implementation is embedded within routing subsystem components, including for example, ISIS, OSPF, BGP, RIB (Routing Information Base), LDP, LSD (Label Switching Database), and FIB (Forwarding Information Base), as described below with respect to FIGS. 3 and 4.

Figure 3:
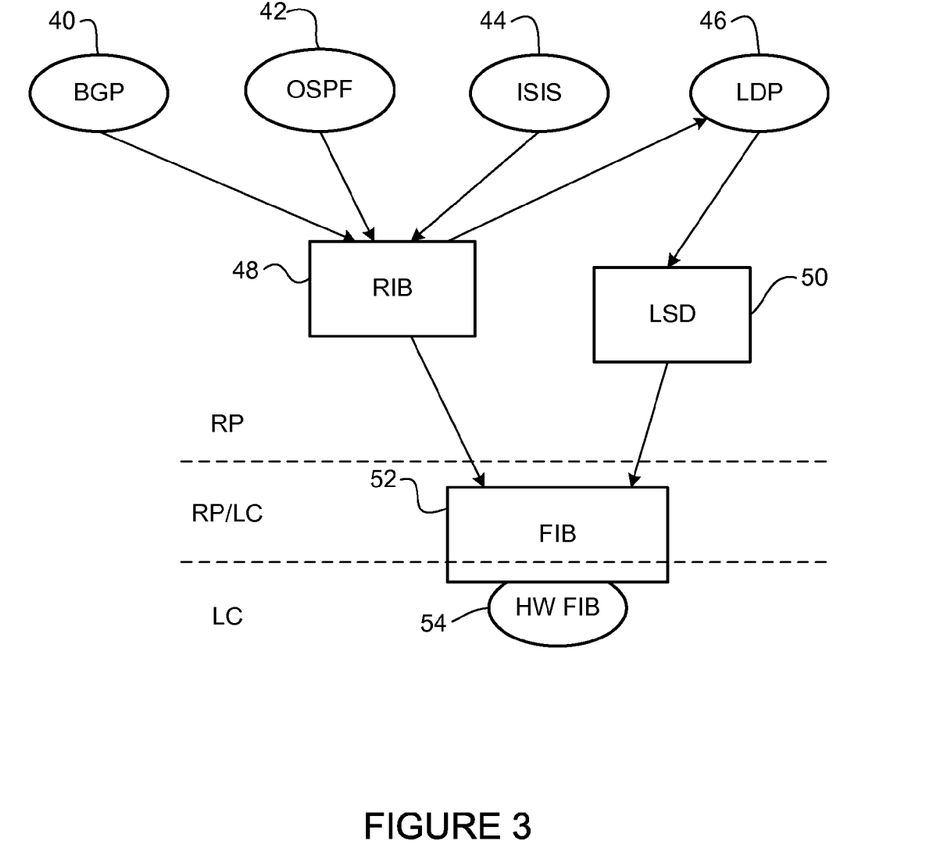
FIG. 3 is a diagram illustrating routing components at which routing updates are monitored at the network device.

FIG. 3 schematically illustrates routing components (sub-components) on which RCMD implementation is embedded within the network device. Event triggers that lead to a routing table recomputation are identified within a routing protocol (e.g., BGP 40, OSPF 42, ISIS 44, or LDP 46). The protocols therefore include a route event monitoring module, as described below with respect to FIG. 4. BGP 40, OSPF 42, and ISIS 44 provide information to the RIB (routing information base or routing table) 48. LDP 46 provides information to LSD 50. The RIB 48 is constructed and updated by routing protocols, and the FIB (forwarding information base or forwarding table) is programmed by the RIB 48 and LSD 50. An IGP update may take the following path through routing components, for example, for IP: OSPF->RIB->FIB, for MPLS: OSPF->RIB->LDP->LSD->FIB.

In one example, ISIS 44 is used for detecting SPF event triggers, collecting event information and tracking timestamps for LSP changes, SPF start/stop, and route flow provisioning to the RIB 48. OSPF 42 is used for detecting SPF and LSA change event triggers, collecting event information, and tracking timestamps for LSA changes, SPF start/stop, and route flow provisioning to RIB 48. LDP 46 is used to detect LDP session and adjacency status changes that would trigger IGP events when LDP-IGP sync is in use. The RIB 48 tracks timestamps for route flow provisioning towards the linecard FIB 52 and LDP 46. The LSD 50 tracks timestamps for route label flow provisioning from the LDP 46 and towards the linecard 52. The FIB 52 tracks timestamps for route and label flow provisioning received from the RIB 48 and LSD 50, and on completion of programming the hardware tables at hardware FIB 54.

In one embodiment, a bulk content downloader (BCDL) is used to transfer data from the RIB 48 and LSD 50 to the FIB 52. There may be any number of linecards (LCs) and FIBs at each router.

Figure 4:
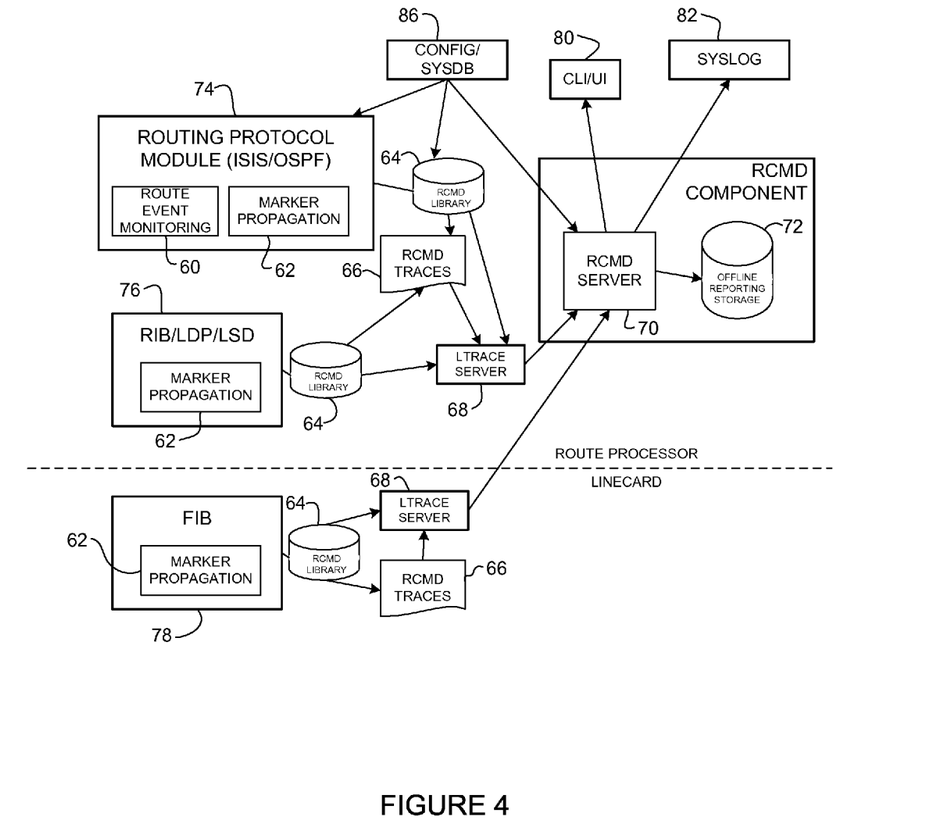
FIG. 4 is a diagram illustrating RCMD (Route Convergence Monitoring and Diagnostics) functional blocks for use in route convergence monitoring at the network device, in accordance with one embodiment.

FIG. 4 illustrates RCMD functional blocks at the network device, in accordance with one embodiment. In this example, the RCMD infrastructure includes route event monitoring 60, marker propagation 62, RCMD library 64, RCMD traces 66, ltrace server 68, RCMD server 70, and offline reporting file storage 72.

Route event monitoring sub-module 60 is implemented within each routing protocol module 74. Route event monitoring involves identification of event triggers within the routing protocol, tracking the times taken in processing, and gathering of additional data about the protocol event state for a better understanding of the event. Information is collected within the routing protocol implementation to detect events and other protocol specific information needed for reporting purposes. The implementation may vary for different protocols.

The routing protocol module 74 also includes a marker propagation mechanism 62 used to propagate markers across component APIs (Application Programming Interfaces) and store the markers in the same databases as routes while the provisioning requests are queued. The marker propagation mechanism 62 is also located at the RIB, LDP, and LSD (represented by block 76 in FIG. 4) and FIB 78.

Measurement of convergence within the router includes tracing of timestamps of a route flow across various system components from its origination point in the routing protocol module 74 to the FIB 78 on the linecard. In the example shown in FIG. 4, this tracking functionality is implemented in the RCMD library functional block 64. In one embodiment, RCMD uses tracking based on start/end markers for route changes arising out of convergence events that identify each route sub-flow for a specific priority class. These markers carry unique identifiers that are defined based on the specific protocol event. The process of tracing timestamps as they propagate through various components is protocol independent. The marker management capabilities are made available for all routing components via a generic RCMD library 64.

The RCMD specific information is stored at RCMD library 64 at the components 74, 76, 78 so that it can be retrieved at regular intervals for monitoring of the event. In the example shown in FIG. 4, server 68 (referred to herein as an ltrace server) is used by various components for storing the information in shared memory. The library 64 is made available for all routing components involved in the tracking of route flows.

While the routing protocol components trace the routing protocol event trigger, start time, and additional protocol specific event information, the RCMD library 64 traces the router-wide route provisioning timeline for the event. The components that trace and collect the event data are spread across the route processor/linecard nodes and therefore the raw trace data needs to be gathered within a single entity. This is the function of the RCMD server 70. The server 70 uses ltrace infrastructure to consolidate traces from across multiple route processor and linecard nodes at the route processor.

In one embodiment, the RCMD server function is performed in a client/server manner across the route processor and linecard nodes, with the RCMD library 64 and ltrace server 68 being the clients. The RCMD server 70 may periodically retrieve RCMD traces and file the data in a structured database (e.g., offline reporting storage 72). The process of computation for the route provisioning time and its verification against a threshold at specified intervals is also performed by the RCMD server 70. If a threshold is exceeded, alarms may be generated by the server 70. The RCMD server 70 is also responsible for storing the event data collected in a persistent manner so that it is available for reporting.

Offline reporting storage 72 is used to store files used by offline tools. The offline reporting file storage 72 comprises persistent storage of the processed data on the route processor disk or a specified remote location. In one embodiment, the RCMD database 72 and an API are provided for supporting third-party applications. The APIs may be defined, for example as XML schema, which can be easily integrated into other tools.

The RCMD server 70 also communicates with a CLI (command line interface)/UI (user interface) 80 and a system log (syslog) 82. The user interface 80 may be configured to provide, for example, show commands to provide basic reports or XML access to complete data for customized reports. The CLI/UI 80 may be used, for example, to provide reports for last N events stored at RCMD server 70. The data can be leveraged by a sophisticated offline tool or imported into a simple database for further processing to generate additional reports, trending, and the like. The system log (syslog) component 82 may be used to collect or track logs from the RCMD server 70. The use of system logs are discussed further below. A configuration/system database 86 provides input to the RCMD library 64, RCMD server 70, and routing protocol module 74.

It is to be understood that the block diagram and components shown in FIG. 4 and described above is only an example, and that the embodiments may be implemented in network devices comprising different functional components without departing from the scope of the embodiments.

The following describes additional details for functions of the module/components participating in the implementation of RCMD in the functional block diagram of FIG. 4.

The routing protocol module 74 initializes the RCMD library 64 that provides APIs for convergence monitoring. It also informs the library 64 when it has reached convergence completion so that RCMD can start monitoring regular events after things have stabilized after a process restart or other event. The routing protocol module 74 also generates flooding traces (LSP for ISIS, LSA for OSPF) and SPF traces. For ISIS, the module 74 generates traces for SPF triggers, at the start and end of an SPF run, and at the end of the run with statistics for that run. For OSPF, the module 74 generates SPF and Dijkstra traces at the start and end of SPF and Dijkstra runs, and at the end of runs with statistics for that run.

As noted above, the routing protocol module 74 includes marker propagation mechanism 62 for propagating markers used to identify the batch of route changes resulting from a SPF run (or Dijkstra run for OSPF). A pair of markers (with SPF run number as ID for ISIS, SPF and Dijkstra run numbers as ID for OSPF) is created for each priority class which has changed routes. Convergence traces are generated from the markers when routes are sent to the RIB.

Link event traces are generated by the routing protocol module 74 for any local interface state change that would result in triggering of a convergence event or for when it receives changes in the LDP-IGP sync status for any local interface.

LDP generates LDP adjacency and session event traces on changes in status to enable correlation to IGP event when LDP-IGP sync is enabled. LDP receives markers along with redistributed IGP routes from RIB. Markers need to be traced when LDP updates the routes into its table or sends towards LSD along with labels.

The RIB receives markers from routing protocols 74 along with route update batches and retains the markers along with route updates in its database until the updates are sent down to the linecard FIB 78. The RIB also propagates the markers along with the IGP route updates via the redistribution path to LDP.

The LSD receives markers along with IGP labeled routes from LDP. Markers are traced when LSD updates the labeled routes into its table or first sends update for a batch of routes towards the FIB 78.

The FIB 78 receives markers for IP routes from the RIB and labeled routes from the LSD. Markers are traced for both labeled and unlabeled update flows when provisioning is complete. The hardware FIB generates a timestamp after the last route is provisioned in the hardware.

Markers are used to define a route flow or batch of route changes generated at routing protocol level for a convergence event. The markers occur in start and end pairs placed before the first route and after the last route in the update batch. In one embodiment, flows are tracked based on prefix prioritization, with four pairs of markers; one for each critical, high, medium, and low priority route. Each marker is unique so that they can identify route flows for multiple/overlapping/simultaneous events through the components in the route provisioning control flow.

The marker ID is opaque information that needs to be propagated end-to-end (router-wide) along with route updates from routing protocol components down to the linecard FIB 78. Each component puts out a trace (including marker ID) when it encounters a marker during route processing. Collating of trace timestamps across components for a given marker helps build the convergence timeline. For events where individual route changes are being tracked (specific prefix monitoring and the like), only the end marker may be used as an optimization.

The markers may be defined, for example, by event type (OSPF SPF, OSPF Dijkstra, ISIS SPF), instance ID (IGP instance (for ISIS also level and link topology)), event ID (SPF run number for ISIS/OSPF SPF event, SPF run number and Dijkstra run number for OSPF Dijkstra event, LSA ID and sequence number for OSPF t3/t5 event, LDP ID and sequence number for ISIS leaf event), priority (1 (critical), 2 (high), 3 (medium), 4 (low)), start or end. Markers also carry a start timestamp of the event and may be duplicated at RIB level for IP and MPLS provisioning paths.

In one embodiment, the marker comprises two fields; a bit flag and an ASCII string. The bit flag indicates whether a trace should be logged for the route. For example, only the first and last routes per priority may have this flag set. The ASCII string contains an ID that allows for unambiguous correlation of traces among components (RIB, FIB, etc.) and routing events. In one example, the ID is defined as: <routing instance>-<event sequence number>-<priority>-<start/end>. For example, if 1.1.1.1/32 has the trace bit set and the ASCII string "ISISinstance1-124-critical-end", then the following traces will be logged by all of the components processing the route update: T1: ISIS: ISISinstance1-124-critical-end, T2: RIB: ISISinstance1-124-critical-end, T3: LDP: ISISinstance1-124-critical-end, T4: LSD: ISISinstance1-124-critical-end, T5: FIB LCx: ISISinstance1-124-critical-end, T6: FIB LCy: ISISinstance1-124-critical-end. Thus, the worst case time for updating a critical prefix for event 124 of ISIS instance 1 is max (T6, T5)–T1. The timestamp from the received route information can be used to add the propagation and flooding delay to derive the end-to-end convergence (from remote failure to local update).

Figure 5:
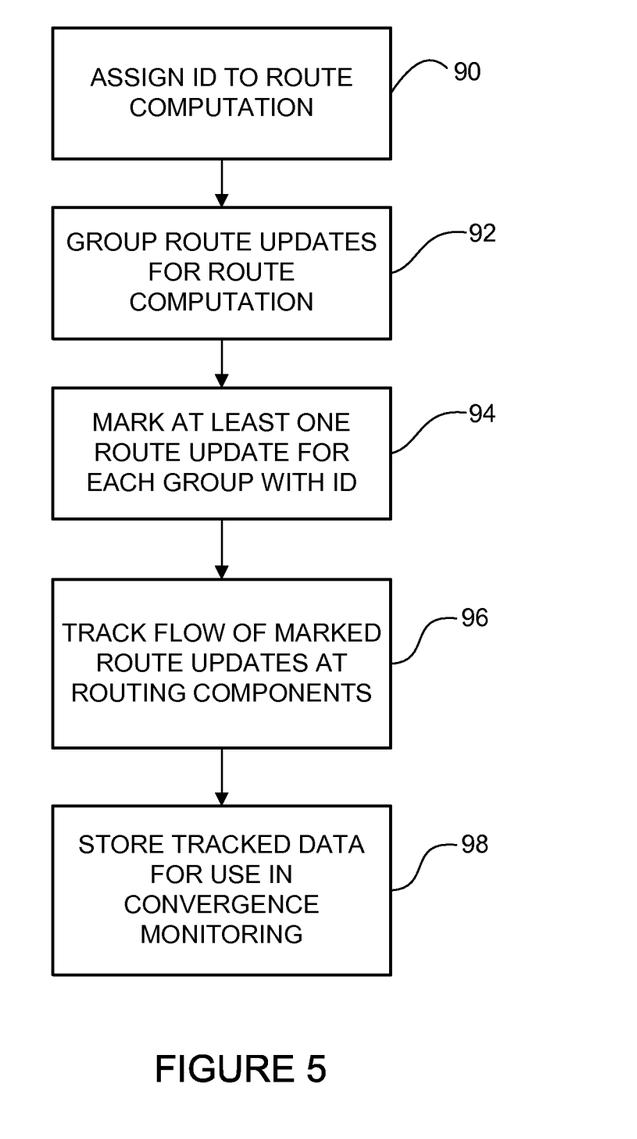
FIG. 5 is a flowchart illustrating an overview of a process for monitoring route convergence at the network device, in accordance with one embodiment.

FIG. 5 is a flowchart illustrating an overview of a process for monitoring convergence at a network device (e.g., router 14), in accordance with one embodiment. At step 90, an identifier is assigned to a route computation (routing table recomputation, routing event) at the network device. All related triggers (i.e., reasons that lead to a given route computation) are logged according to that identifier. The routing event involves a route flow (i.e., a set of sequential route updates). The route updates are grouped for the route computation (step 92). In one embodiment, the route updates are prioritized and grouped into different priorities. For example, each route flow may be made up of four ordered sub-flows representing four classes of service (critical, high, medium, and low). At least one route update for each group of updates is marked with the identifier (step 94). In one embodiment, the first and last route updates of each sub-flow are marked with the identifier of the related route computation. The flow of marked route updates is tracked at a plurality of routing components (e.g., from routing protocol software component 74 to hardware forwarding information base 78 (FIG. 4)) (step 96). As previously described, each routing component traces the markers (identifiers, IDs). The tracking data (e.g., traces, timestamps) is stored at the network device for use in convergence monitoring (step 98). The tracking data collected at the router may be used along with the timestamp received with the route information to provide an end-to-end convergence.

It is to be understood that the flowchart shown in FIG. 5 and described above is only an example and that steps may be added, removed, or modified, without departing from the scope of the embodiments.

As previously described, RCMD reports when the device converged (i.e., finished updating its hardware based forwarding) for one or more network events (e.g., link failures). One or a series of network events are identified via the route updates that carry the change information to different routers. The time taken by the router to process the changes (along with other details related to the processing) may be reported using any suitable data structure or format.

The following describes extensions for RCMD implementation and use examples for RCMD.

In one embodiment, an extension is provided for LFA (Loop Free Alternate) coverage. As service providers enable and deploy LFA technology in their networks, one key aspect that they focus on is the amount of coverage that they achieve (i.e., for how much percentage of routes do they have backup (LFA) routes available). Network topologies change due to planned modifications, growth, maintenance windows, and even failures. It is thus difficult from an operational viewpoint to keep track of LFA coverage and how it is being affected in production networks over a long period of time, whether some specific services (e.g., destinations) are always LFA protected or not.

In one example, a report for an SPF event includes convergence event (i.e., SPF run) and time taken to provision route and label changes across all line cards. The report may also include SPF computation statistics, trigger reasons, wait times, and LSPs that were processed and the timestamp of when their change was detected. The (per SPF) convergence event reports generated by RCMD may be extended to include LFA coverage available at the end of each SPF run. Based on the location of the router in the network, the service provider can also specify a threshold value expected for LFA coverage and RCMD can raise a syslog/alarm when the coverage drops below this level to alert the network operations center. The coverage calculation can be monitored for important/critical prefixes (e.g., leaf networks) which correspond to actual service endpoints rather than all routes that may also include lower priority infrastructure routes of less relevance. This also provides the ability to monitor LFA coverage for a small number of specific destinations (services). On the basis of minimum coverage threshold being exceeded, automated diagnostic collection (state of the topology) can be triggered to help operations understand why such an unexpected low level of LFA protection occurred.

Extensions may also be provided for BGP (Border Gateway Protocol), TE (Traffic Engineering), and PIM (Protocol Independent Multicast) events. For BGP, the time taken for all routes (per AFI (Address Family Identifier)/SAFI (Subsequent Address Family Identifier)) to converge post a session up/down or a neighbor up/down event is tracked. Prioritization levels (e.g., critical, high, medium low) may be introduced within BGP and first and last route updates tracked per priority per BGP recomputation event. Change in BGP state may be logged per class and service type. The neighbor up/down event is extended from the RCMD IGP convergence event report to the BGP convergence event. Tracking for BGP routes (e.g., IETF RFC 3107 "Carrying Label Information in BGP-4", Y. Rekhter et al., May 2001) may be provided similar to support provided for OSPF Type 3/5/7 routes (i.e., track add and purge). The ability to perform specific prefix monitoring for all types of BGP routes may also be provided.

For TE, RCMD may be used to track how an event detected at the PLR (Point of Local Repair) is propagated to the head-end (via RSVP (Resource Reservation Protocol) and IGP) and how the end-to-end re-optimization of the LSP (Label Switched Path) is done from head to tail and eventually to the switchover from the failed LSP to the new re-optimized LSP. This provides the TTOB (Total Time on Backup), but more importantly the timeline of the entire process. Also, TE tunnel events may be tracked along with their triggers into the IGP convergence.

As discussed above, RCMD may be configured for network-wide IGP (Interior Gateway Protocol) flooding and event correlation. The RCMD report for the router also provides the LSP (Link State Packet)/LSA (Link State Advertisement) identifiers which triggered the event and were processed during the SPF run. These identifiers provide a mechanism to correlate the RCMD SPF run reports on various routers in the network and tie them to the network failure event which resulted in that LSP/LSA to get regenerated by the routers connected to the failure. This feature provides the capability to perform offline analysis and correlation of convergence events across the network.

The LSP/LSA flooding information, which is part of the RCMD report, also provides the ability to measure the flooding propagation delays between the source of the LSP/LSA and any given router via offline correlation of the identifiers. In the case of ISIS, the RCMD reports also provide the ability to correlate convergence events across areas by tracking LSP regenerations into other areas caused by SPF route computation changes in the source area at the L1 (layer 1)-L2 (layer 2) router.

As discussed above, an IGP protocol extension is used to identify the original time of a trigger. In conventional systems, a router is only able to log when a trigger is known locally (e.g., when a router receives an LSP/LSA from a remote router advertising a link failure). In order for the router to learn when the failure occurred at the remote location, a timestamp is added to the LSP/LSA update, as previously described. The remote router sets this timestamp to the time when it detected the failure. This allows for two significant improvements: measuring how fast information flows through the network (LSP/LSA flooding measurement) and allowing RCMD on a router to assess the complete convergence time from when the event occurred (instead of when the router was made aware of it). The first improvement allows RCMD infrastructure to monitor flooding delays against a threshold and to generate system logs and trigger diagnostic collection. By making a timestamp TLV transitive across areas, the second improvement makes it possible for RCMD on the router to measure convergence time across the entire IGP domain.

As previously discussed, the system may be configured to provide threshold, system logs (syslogs), and diagnostics. As the router itself is now able to compute the time from triggers to linecard update (in a correlated and automated manner), automated system logs and diagnostic activities can be generated on the basis of thresholds being exceeded (e.g., more than 500 msec from trigger to linecard update is abnormal for the critical class). This simplifies operation (e.g., network operations center is alarmed automatically) and provides for better diagnostics. Upon detecting an abnormal behavior, RCMD may trigger an EEM (Embedded Event Manager) script on the router so that it may retrieve a finer-level of logs that otherwise would disappear within a few seconds after the event.

In another embodiment, an extension is provided for tracking specific prefix convergence. Service providers today use network probes in their networks to track availability for specific service demands. While the probes convey availability data, they do not offer sufficient troubleshooting mechanisms to isolate the issue and collect diagnostic data across routers leading to the problem. RCMD infrastructure provides a feature that allows service providers to enable tracking of all convergence events for a small number of prefixes. The individual prefix monitoring report by RCMD provides the timeline and details from the time that the LSP/LSA that affected the prefix was received by the router, until the updated route was programmed across all linecards on the router. The details also include the nature of change and which paths were added or removed. The threshold/syslog/diagnostics mechanism described above is also available for individual prefix monitoring. This RCMD feature may be used, for example, to support the highest-level API where an application requests for the availability of a specific destination to be tracked throughout the network.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
assigning an identifier to a route computation at a network device;
grouping route updates for said route computation, wherein grouping route updates comprises grouping said route updates for said route computation according to a plurality of priorities;
marking at least one route update for each group of route updates with said identifier;
tracking flow of marked route updates at a plurality of routing components within the network device; and
storing tracking data at the network device for use in convergence monitoring.

2. The method of claim 1 wherein tracking flow of marked route updates comprises tracking said flow from a routing protocol software component to a hardware forwarding information base.

3. The method of claim 1 wherein said identifier is associated with a topology change and said tracking data comprises events that triggered said route computation.

4. The method of claim 1 wherein said priorities comprise Interior Gateway Protocol priorities.

5. The method of claim 1 wherein marking said route updates comprises marking a first and a last of said route updates for each of said priorities.

6. The method of claim 1 further comprising receiving route information for said route computation and a timestamp indicating when said route information was transmitted.

7. The method of claim 6 further comprising computing an end-to-end convergence time based on said received timestamp and a timestamp indicating when a last route was updated across linecards at the network device.

8. The method of claim 6 further comprising calculating a flooding time based on when said route information was transmitted and received, and generating an alarm if said flooding time exceeds a specified threshold.

9. The method of claim 1 further comprising calculating an update time at the network device based on said tracking data and generating an alarm if said update time exceeds a specified threshold.

10. The method of claim 1 further comprising collecting tracked data for specified prefixes.

11. The method of claim 1 further comprising generating a convergence event report for each Shortest Path First (SPF) run and inserting an indication of loop free alternate coverage at the network device into the report.

12. The method of claim 1 further comprising tracking a time taken for all routes to converge following a Border Gateway Protocol (BGP) up or down event.

13. The method of claim 1 further comprising tracking Traffic Engineering (TE) events for a convergence.

14. An apparatus comprising:
a plurality of routing components;
a processor for assigning an identifier to a route computation at the apparatus, grouping route updates for said route computation, marking at least one route update for each group of route updates with said identifier, tracking flow of marked route updates at said plurality of routing components, and processing received route information for said route computation and a timestamp indicating when said route information was transmitted; and
memory for storing tracking data for use in convergence monitoring.

15. The apparatus of claim 14 wherein said plurality of routing components comprise software routing protocol components and a hardware forwarding information base.

16. The apparatus of claim 14 wherein grouping route updates comprises grouping said route updates for said route computation according to a plurality of priorities and wherein marking said route updates comprises marking a first and a last of said route updates for each of said priorities.

17. The apparatus of claim 14 wherein the processor is operable to compute an end-to-end convergence time based on said received timestamp and a timestamp indicating when a last route was updated across linecards at the apparatus.

18. The apparatus of claim 14 wherein the processor is further operable to calculate an update time at the network device based on said tracking data and generate an alarm if said update time exceeds a specified threshold.

19. Logic encoded on one or more non-transitory computer readable media for execution and when executed operable to:
assign an identifier to a route computation;
group route updates for said route computation;
mark at least one route update for each group of route updates with said identifier;
track flow of marked route updates at a plurality of routing components within a network device;
store tracking data at the network device for use in convergence monitoring; and
calculate an update time at the network device based on said tracking data and generate an alarm if said update time exceeds a specified threshold.

20. The logic of claim 19 wherein route updates are grouped according to a plurality of policies.

* * * * *